(12) United States Patent
Lee et al.

(10) Patent No.: US 7,683,991 B2
(45) Date of Patent: Mar. 23, 2010

(54) MULTI-DOMAIN PIXEL STRUCTURE IN A SYSTEM FOR DISPLAYING IMAGES

(75) Inventors: Mu-Chia Lee, Taipei (TW); Hao-Chun Lee, Jhunan Township (TW); I-Lin Wu, Jhunan Township (TW); Chun-Yi Lee, Jhonge (TW); Cheng-Hsin Chen, Yuanlin Township (TW)

(73) Assignee: TPO Displays Corp., Chu-Nan (TW)

( * ) Notice: Subject to any disclaimer, the term of this patent is extended or adjusted under 35 U.S.C. 154(b) by 364 days.

(21) Appl. No.: 11/731,341

(22) Filed: Mar. 29, 2007

(65) Prior Publication Data
US 2008/0238841 A1 Oct. 2, 2008

(51) Int. Cl.
G02F 1/1337 (2006.01)
G02F 1/1343 (2006.01)
(52) U.S. Cl. .......................... 349/129; 349/38; 349/144
(58) Field of Classification Search ................. 349/129, 349/38, 39, 130, 144
See application file for complete search history.

(56) References Cited

U.S. PATENT DOCUMENTS

| | | | | |
|---|---|---|---|---|
| 6,407,791 | B1 * | 6/2002 | Suzuki et al. | 349/129 |
| 7,262,824 | B2 * | 8/2007 | Sasabayashi et al. | 349/129 |
| 7,330,220 | B2 * | 2/2008 | Tanaka et al. | 349/38 |
| 2007/0211187 | A1 * | 9/2007 | Misaki et al. | 349/38 |

FOREIGN PATENT DOCUMENTS

| | | |
|---|---|---|
| EP | 1605511 | 12/2005 |
| JP | 2006201356 | 8/2006 |

* cited by examiner

*Primary Examiner*—Mike Qi
(74) *Attorney, Agent, or Firm*—Liu & Liu (57) ABSTRACT

A system for displaying images is disclosed. A display panel having a multi-domain pixel structure comprises a plurality of electrodes that are physically separated form one another, each defining a domain within pixel, and a capacitance element, electrically connecting the electrodes.

18 Claims, 9 Drawing Sheets

MULTI-DOMAIN PIXEL STRUCTURE IN A SYSTEM FOR DISPLAYING IMAGES

BACKGROUND OF THE INVENTION

1. Field of the Invention

The invention relates to a display device, and more particularly to a liquid crystal display device.

2. Description of the Related Art

Liquid crystal displays (LCD) have become widely used, with a working principle based on alignment condition of liquid crystal molecules changing by application of an electrical field so as to change the path of light passing therethrough. Typically, an LCD includes two opposite substrates with a gap therebetween receiving liquid crystal. Both substrates are formed with electrodes to control orientation and arrangement of liquid crystals. Images are displayed on the LCD panel by controlling orientation of liquid crystals with electrical field, in which bright dots or dark dots are generated where the light passes or is blocked.

LCDs, however, present several disadvantages and limitations, among narrow view angle. At present, a number of propositions for manufacturing wide view angle LCD are in the developing stage. The most widely adopted technique is the so-called multi-domain vertical alignment (MVA) technology. The alternately positioned slit-spacing-protrusion structure in each pixel is used and a single pixel is divided into several domains so that liquid crystal molecules in different domains have different tilt directions. Hence, view angle of the LCD is increased.

Figure 1A:
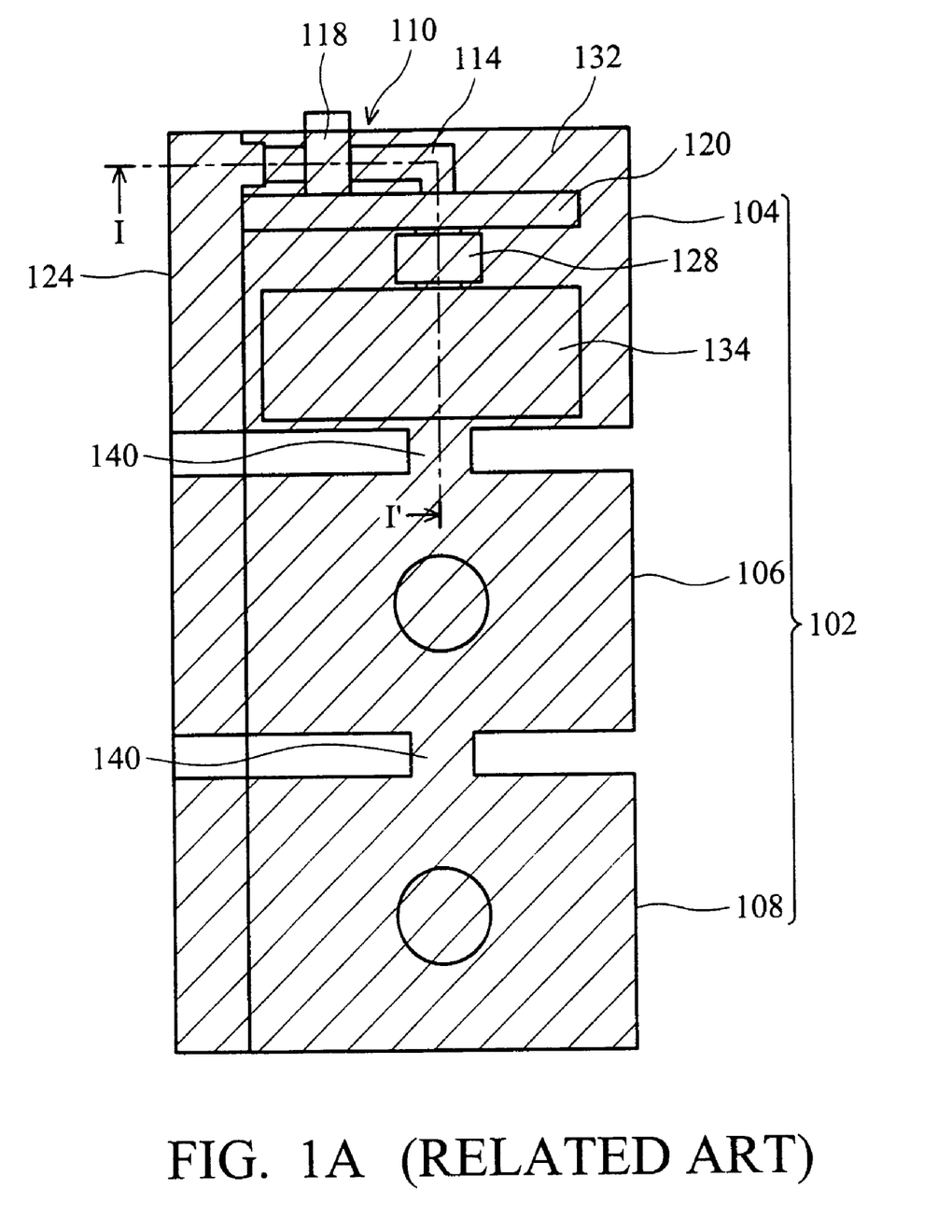
FIG. 1A is a plan view of a pixel structure a conventional multi-domain vertical alignment liquid crystal display.
Figure 1B:
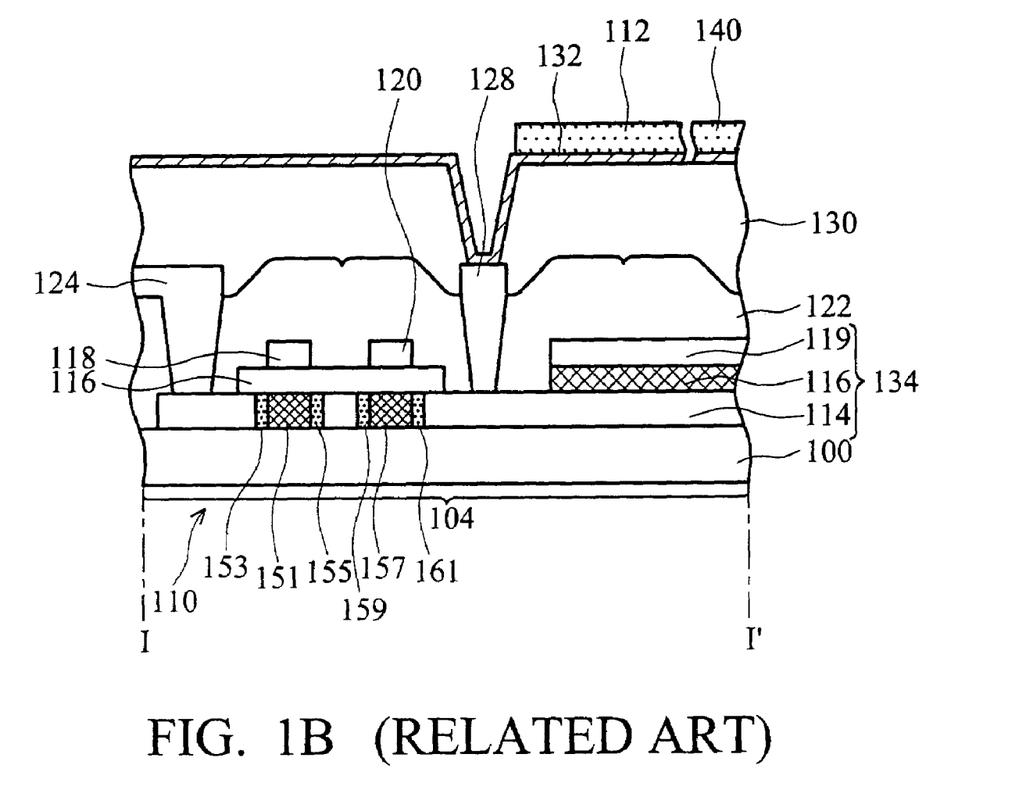
FIG. 1B is a cross section along line I-I' of FIG. 1A.

FIG. 1A shows a plan view of pixel structure of a conventional multi-domain vertical alignment liquid crystal display. FIG. 1B is a cross section along line I-I' of FIG. 1A. Referring to FIG. 1A and FIG. 1B, a pixel 102 comprises a plurality of domains, such as a first domain 104, and a second domain 106 and a third domain 108, wherein the pixel 102 has a pixel electrode that comprises a plurality of domain electrodes. A thin film transistor 110 and a storage capacitor Cst 134 are arranged in the first domain 104. In the first domain 104, a polysilicon layer 114 is formed on a array substrate 100. A gate insulating layer 116 is formed on a portion of the polysilicon layer 114 (In order to simplify the diagram, the gate insulating layer 116 is not shown in FIG. 1a). A first gate line 118 and a second gate line 120 pass on the gate insulating layer 116. A first channel 151 is disposed underlying the first gate line 118 and in the polysilicon layer 114. A first source 153 and a first drain 155 are disposed on opposite sides of the first channel 151. A second channel 157 is disposed underlying the second gate line 120 and in the polysilicon layer 114. A second source 159 and a second drain 161 are disposed on opposite sides of the second channel 157.

The gate lines 118 and 120 and the polysilicon layer 114 are covered by an interlayer dielectric layer 122. A data line 124 and a drain electrode 128 of are formed on the interlayer dielectric layer 122, in which the data line 124 and the drain electrode 128 electrically connect the polysilicon layer 114. The data line 124 and the drain electrode 128 are covered by a planarization layer 130. A domain electrodes 132 (a part of the pixel electrode) is formed on the planarization layer 130, in which the domain electrodes 132 electrically connects the drain electrode 128 of the thin film transistor 110. The storage capacitor Cst 134 comprises the polysilicon layer 114, the gate insulating layer 116 and a first metal layer 119.

In a transflective liquid crystal display, a reflective layer 112 is formed on the domain electrode 132, substantially overlapping the storage capacitor Cst 134. In conventional technology, the domains 104, 106 and 108 are connected by a thin ITO neck 140 therebetween. The ITO neck 140 cannot be too wide to avoid affecting performance of the liquid crystal display. The reflective layer 112, however, is likely to react with the domain electrode 132 thereunder, such that the reacted ITO neck 140 is easily cracked to generate dots, and the domains cannot have the same voltage level.

BRIEF SUMMARY OF THE INVENTION

A system for displaying images is disclosed. The system for displaying images comprising a display panel having a multi-domain pixel structure comprises a plurality of electrodes that are physically separated form one another, each defining a domain within pixel, and a capacitance element, electrically connecting the electrodes.

A system for displaying images is also provided. The system for displaying images comprising a multi-domain pixel structure of a display panel further comprises a thin film transistor electrically connecting a pixel electrode of the display panel, wherein the pixel electrode comprises a plurality of domain electrodes domain separated with each other. A conductive line (layer) electrically connects all the domain electrodes.

Further, in other embodiments, the display panel further comprises a first substrate. A thin film transistor is disposed overlying the first substrate, electrically connecting a pixel electrode of the display panel, wherein the pixel electrode comprises a plurality of domain electrodes. The domain electrodes are separated with each other; and a storage capacitor Cst disposed overlying the first substrate, electrically connecting the domain electrodes of the pixel electrode.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims. Embodiments of the invention, which provides a liquid crystal display panel, will be described in greater detail by referring to the drawings that accompany the invention. It is noted that in the accompanying drawings, like and/or corresponding elements are referred to by like reference numerals.

Figure 2A:
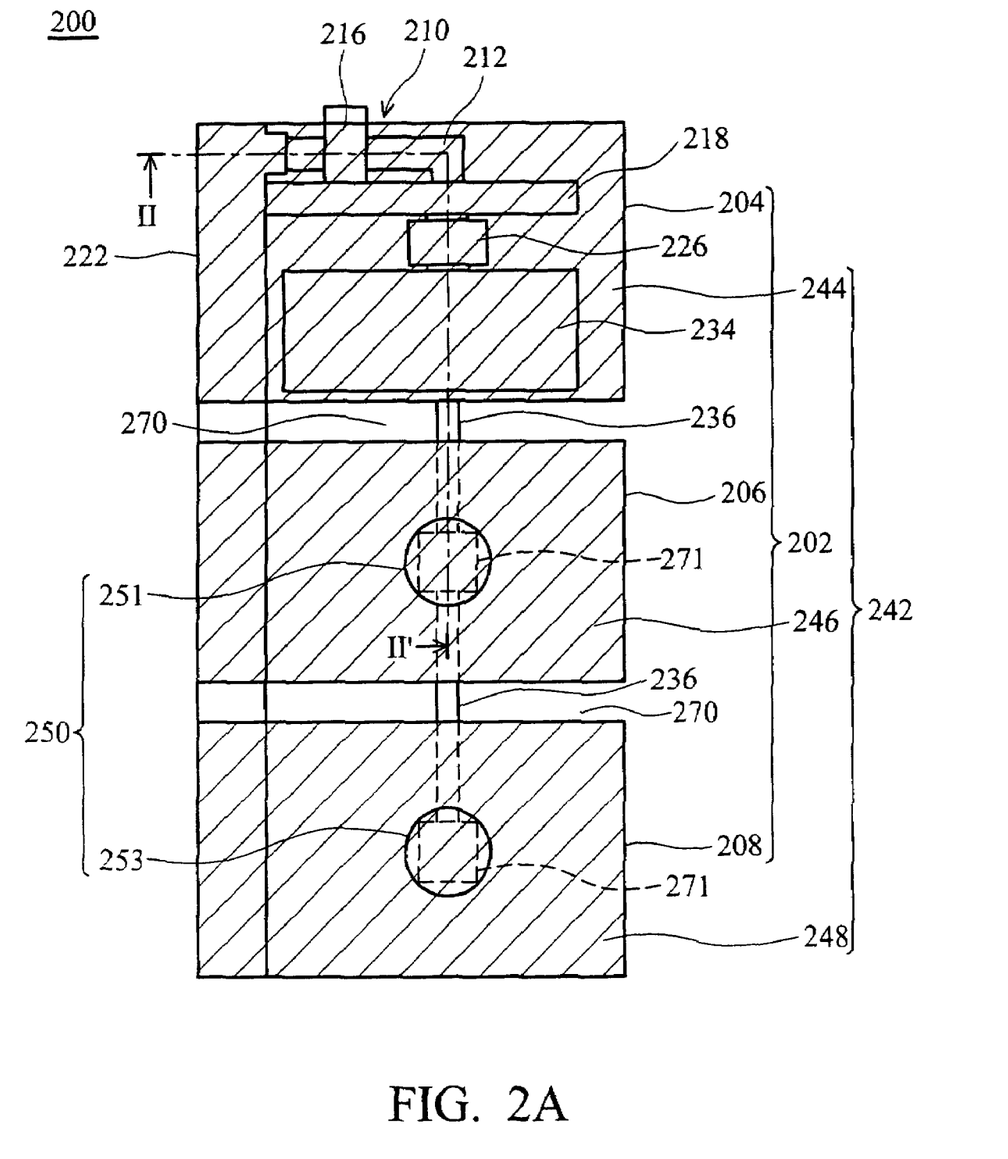
FIG. 2A is a plan view of a pixel of a multi-domain vertical alignment liquid crystal display, in accordance with an embodiment of the invention.
Figure 2B:
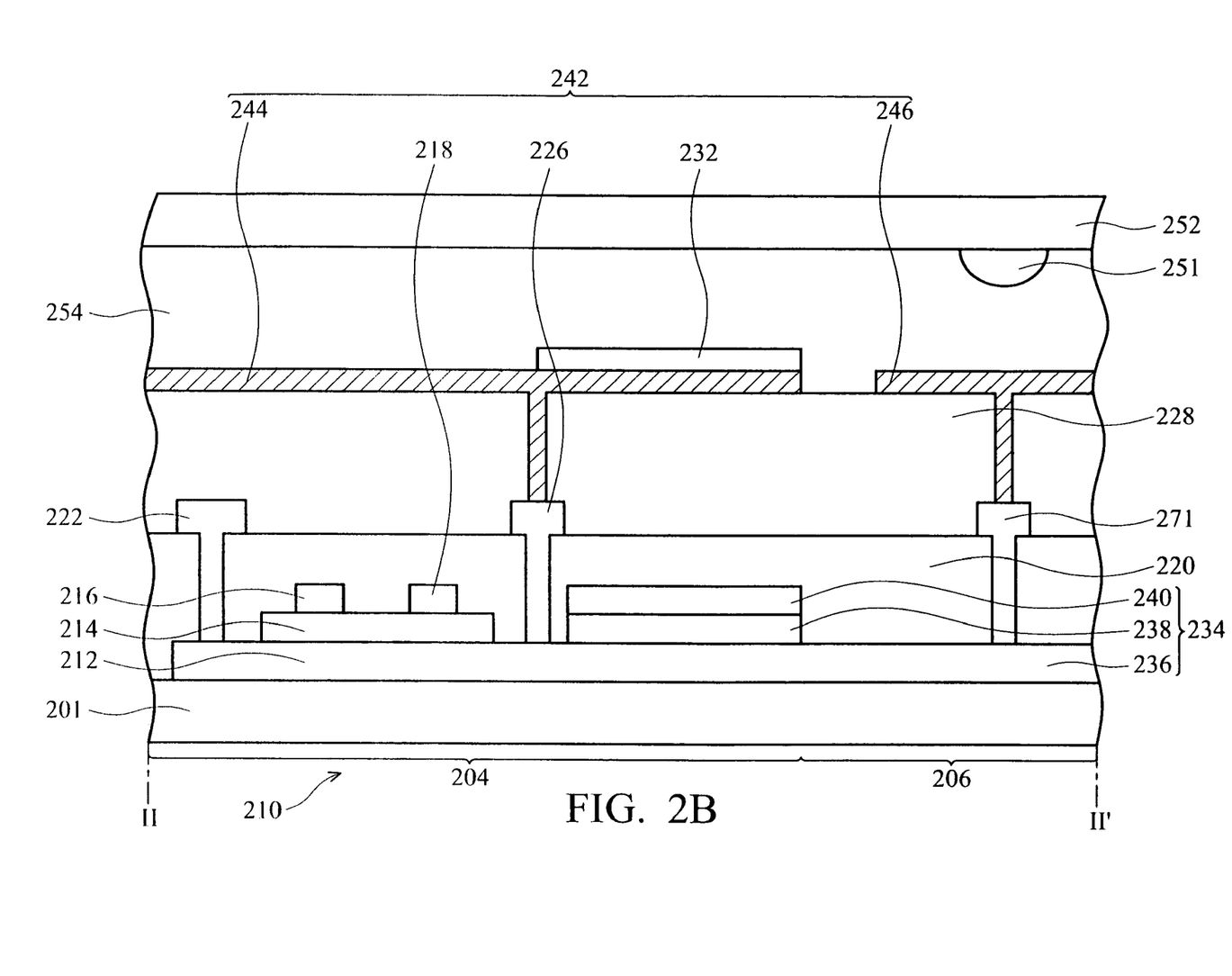
FIGS. 2B and 2C are cross sections along line II-II' of FIG. 2A.

Exemplary embodiments of systems for displaying images will now be described. In this regard, FIG. 2A depicts an embodiment of such a system. Specifically, the system incorporates a liquid crystal display panel 200 of an embodiment of the invention. FIG. 2B is a cross section along line II-II' of FIG. 2A. Referring to FIG. 2A and FIG. 2B, a pixel 202 comprises a plurality of domains separating with each other, such as a first domain 204, and a second domain 206 and/or a third domain 208. The pixel 202 has a pixel electrode 242 comprises a plurality of domain electrodes can be separated with each other by a slit area 270. In the embodiment, the pixel electrode comprising three domain electrodes 244, 246, and 248 is taken for an example. The invention, however, is not limited thereto. The pixel electrode can comprise more or less domain electrodes.

A thin film transistor 210 is arranged in the first domain 204. A semiconductor layer 212, such as a polysilicon layer or an amorphous silicon layer, is formed on an array substrate 201 (or called first substrate). The array substrate 201 can be a low alkali glass substrate or a non alkali glass substrate. A gate insulating layer 214, such as silicon oxide, silicon nitride or silicon oxynitride, is formed on a portion of the semiconductor layer 212. Two gate lines 216 and 218, such as Al, Mo or combinations thereof or stack layers thereof, pass on the gate insulating layer 214. The gate lines 216 and 218, and the semiconductor layer 212 are covered by an interlayer dielectric layer 220, such as silicon oxide, silicon nitride or silicon oxynitride. A data line 222 for inputting data signals to the display panel 200 and a drain electrode 226 are formed on the interlayer dielectric layer 220, electrically connecting the semiconductor layer 212. The data line 222, drain electrode 226 and the interlayer dielectric layer 220 are covered by a planarization layer 228, such as an organic layer. The pixel electrode 242, such as ITO, is formed on the planarization layer 228, and electrically connects the drain electrode 226 of the thin film transistor 210. In an embodiment of the invention, the display is a transflective display, and a reflective layer 232, such as Al, is disposed on a portion of the pixel electrode 202.

A storage capacitor Cst 234 is disposed under the first domain electrode 244 and beyond the thin film transistor 210. The storage capacitor Cst 234 comprises a conductive line (serving as a bottom electrode) 236 on the array substrate 201, a capacitance dielectric layer 238 on the conductive line 236 and a top electrode 240 on the capacitance dielectric layer 238. In some embodiments of the invention, the conductive line 236 of the Cst 234 and the semiconductor layer 212 of the thin film transistor 210 are the same layer, the capacitance dielectric layer 238 of the Cst 234 and the gate insulating layer 214 of the thin film transistor 210 are the same layer, and the top electrode 240 of the Cst 234 and the gate line 216 and 218 are the same layer.

Still referring to FIG. 2A and FIG. 2B, in some embodiments of the invention, a conductive line extends from the conductive line 236 of the storage capacitor Cst 234, the same layer as the semiconductor layer 212, to pass underlying the domain electrodes 244, 246 and 248 of the pixel electrode 242, wherein the conductive line and the semiconductor layer 212 are the same layer, and the conductive line 236 can comprises polysilicon or amorphous silicon.

The conductive line 236 covered by the interlayer dielectric layer 220 and the planarization layer 228 connects the first domain electrode 244, the second domain electrode 246 and the third domain electrode 248 of the pixel electrode 242 electrode through vias 271.

In some embodiments of the invention, the liquid crystal display is a multi-domain vertical alignment (MVA) to obtain wider viewing angle. The liquid crystal display further comprises a color filter substrate 252 (or called second substrate) opposite the array substrate 201, and a liquid crystal layer 254 is interposed between the array substrate 201 and the color filter substrate 252. A plurality of protrusions 250 respectively responding to the domain electrodes 244, 246 and 248 are disposed on the inner side of the color filter substrate 252. For example, a first protrusion 251 and a second protrusion 253 are disposed on the color filter substrate 252, respectively corresponding to the second domain electrode 246 and the third domain electrode 248.

The via 271 for connecting the conductive line 212 and the domain electrodes 244, 246 and 248 can be overlapped with the protrusions 250 disposed on the color filter substrate 252 respectively to reduce affection of aperture ratio of the display device.

According to an embodiment of the invention, the domain electrodes 244, 246 and 248 of the pixel electrode 242 are separated with each other by a slit area 270. The domain electrodes 244, 246 and 248 are connected by a conductive line extending from the conductive line 236 of the storage capacitor Cst 234. Thus, the domain electrodes can have substantially a same voltage level, and the ITO neck is not required. Consequently, the ITO neck crack problem could be eliminated, and performance of front of screen of the display device could be optimized. Further, a portion of the conductive line extending from the conductive line 236 connecting the domain electrodes 244, 246 and 248 are overlapped with the protrusions to reduce affection of aperture ratio of the display device.

Figure 2C:
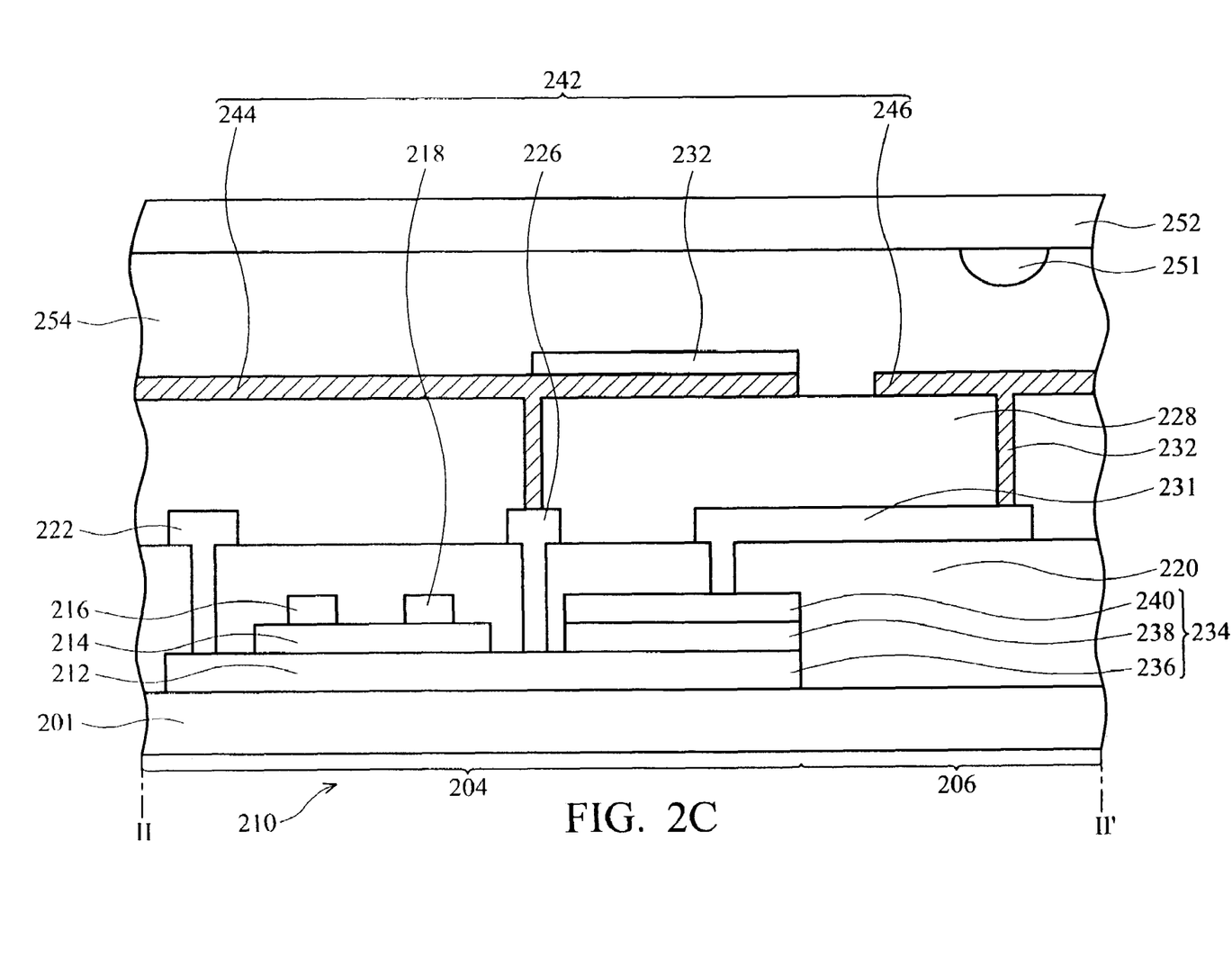

FIG. 2C depicts another embodiment of such a system. Referring to FIG. 2C, the top electrode 240 of the Cst 234 is electrically connected to a connection layer 231 through a third via. The connection layer 231, the same layer as the data line, can be acted as a conductive line extending underlying the domain electrodes 246 and 248 of the pixel electrode 242. The conductive line (connection layer 231) covered by the interlayer dielectric layer 228 connects the first domain electrode 244, the second domain electrode 246 and the third domain electrode 248 of the pixel electrode 242 through fourth via 232.

As the embodiment shown in FIG. 2B, the domain electrodes directly connect to the conductive line and are electrically contacted together. In the other hand, the embodiment shown in FIG. 2C discloses that the domain electrodes can also indirectly connect to the conductive line and are electrically contacted together.

Figure 3A:
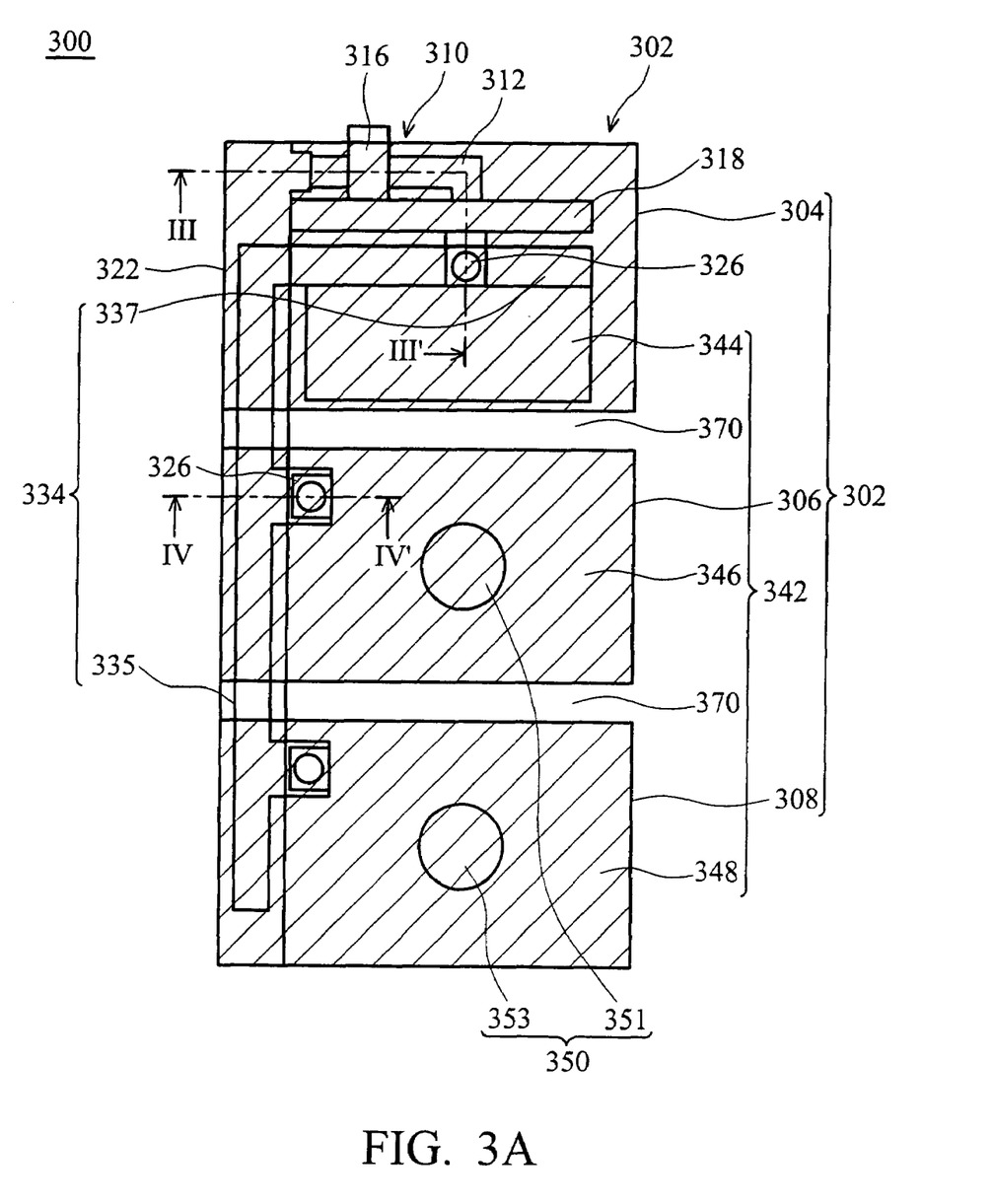
FIG. 3A is a plan view of a pixel of a multi-domain vertical alignment liquid crystal display, in accordance with another embodiment of the invention.
Figure 3B:
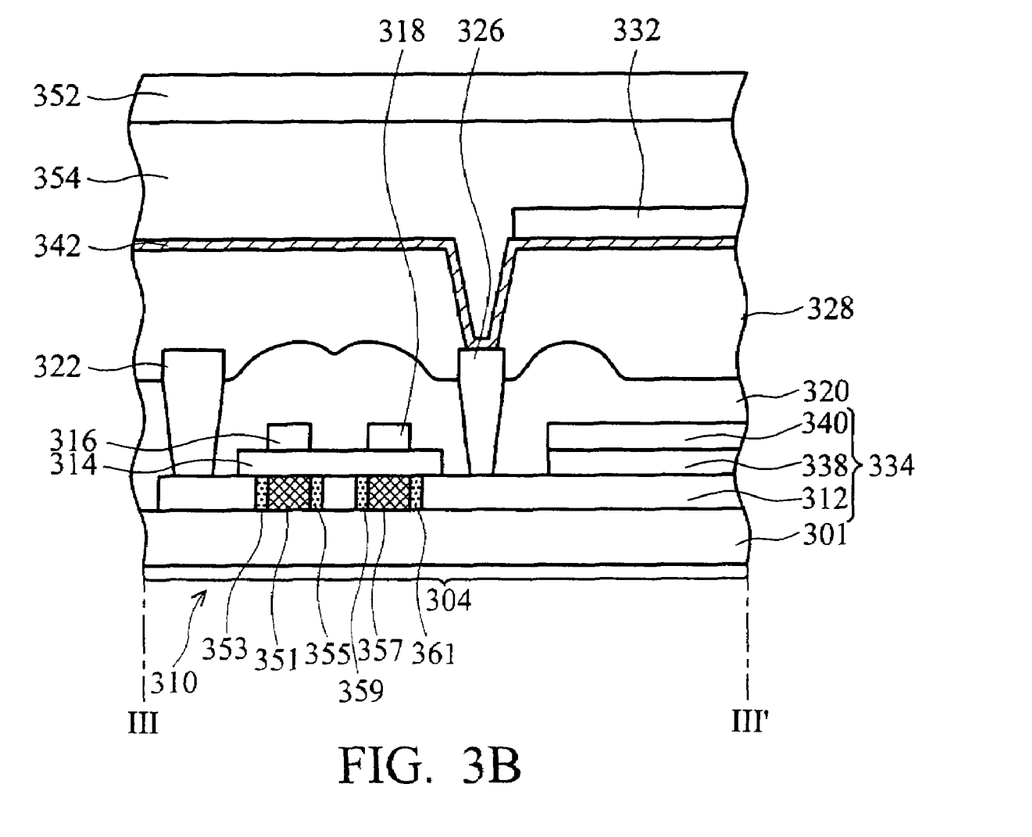
FIG. 3B is cross sections along line III-III' of FIG. 3A.

Another exemplary embodiment of systems for displaying images is also described, wherein the conductive line located directly below the data line. In this regard, FIG. 3A depicts an embodiment of such a system. Specifically, the system incorporates a liquid crystal display panel 300 of an embodiment of the invention. FIG. 3B is a cross section along line III-III' of FIG. 3A. Referring to FIG. 3A and FIG. 3B, a pixel 302 comprises a plurality of domains, such as a first domain 304, and a second domain 306 and/or a third domain 308. In some embodiment, the domains 304, 306 and 308 of a pixel 302 are separated with each other by the slit area 370. In the embodiment, a pixel comprising three domains is taken for an example. The invention, however, is not limited thereto. A pixel can comprise more or less domains.

A thin film transistor 310 is arranged in the first domain 304. In the first domain 304, a semiconductor layer 312, such as a polysilicon layer or an amorphous silicon layer, is formed on a first substrate 301. In some embodiment, the first substrate 301 can be a low alkali glass substrate or a non alkali glass substrate. A gate insulating layer 314, such as silicon oxide, silicon nitride or silicon oxynitride, is formed on a portion of the semiconductor layer 312. A first gate line 316 and a second gate line 318, such as Al, Mo or combinations thereof or stack layers thereof, pass on the gate insulating layer 314. A first channel 351 is disposed underlying the first gate line 316 and in the polysilicon layer 312. A first source 353 and a first drain 355 are disposed on opposite sides of the first channel 351. A second channel 357 is disposed underlying the second gate line 318 and in the polysilicon layer 312. A second source 359 and a second drain 361 are disposed on opposite sides of the second channel 357.

The gate lines 316 and 318, and the semiconductor layer 312 are covered by an interlayer dielectric layer 320, such as silicon oxide, silicon nitride or silicon oxynitride. A data line 322 and a drain electrode 326 are formed on the interlayer dielectric layer 320, in which the data line 322 and the drain electrode 326 electrically connect the semiconductor layer 312. The data line 322 and the drain electrode 326 are covered by a planarization layer 328, such as an organic layer (the planarization layer 328 is omitted in FIG. 3A to avoid obscuring the figure). A pixel electrode 342, such as ITO, is formed on the planarization layer 328, in which the pixel electrode 342 electrically connects the drain electrode 326 of the thin film transistor 310. In an embodiment of the invention, the display is a transflective display, and a reflective layer 332, such as Al, is disposed on a portion of the pixel electrode 342.

A storage capacitor Cst 334 is disposed nearby the thin film transistor 310. In an embodiment of the invention, the storage capacitor Cst 334 occupies smaller area of the first domain than conventional technology. In some embodiment of the invention, the bottom electrode of the Cst 334 and the semiconductor layer 312 of the thin film transistor 310 are the same layer acting as a conductive line, the capacitance dielectric layer 338 of the Cst 334 and the gate insulating layer 314 of the thin film transistor 310 are the same layer, and the top electrode 340 of the Cst 334 and the gate lines 316 and 318 are the same layer. The bottom electrode (conductive line) 312 is electrically connected to the drain electrode 326 of the thin film transistor 310 through a via, and the drain electrode 326 is connected to the pixel electrode 342.

In addition, a second substrate 352, such as color filter substrate is disposed opposite the first substrate 301. A liquid crystal layer 354 is interposed between the first substrate 301 and the second substrate 352.

Figure 3C:
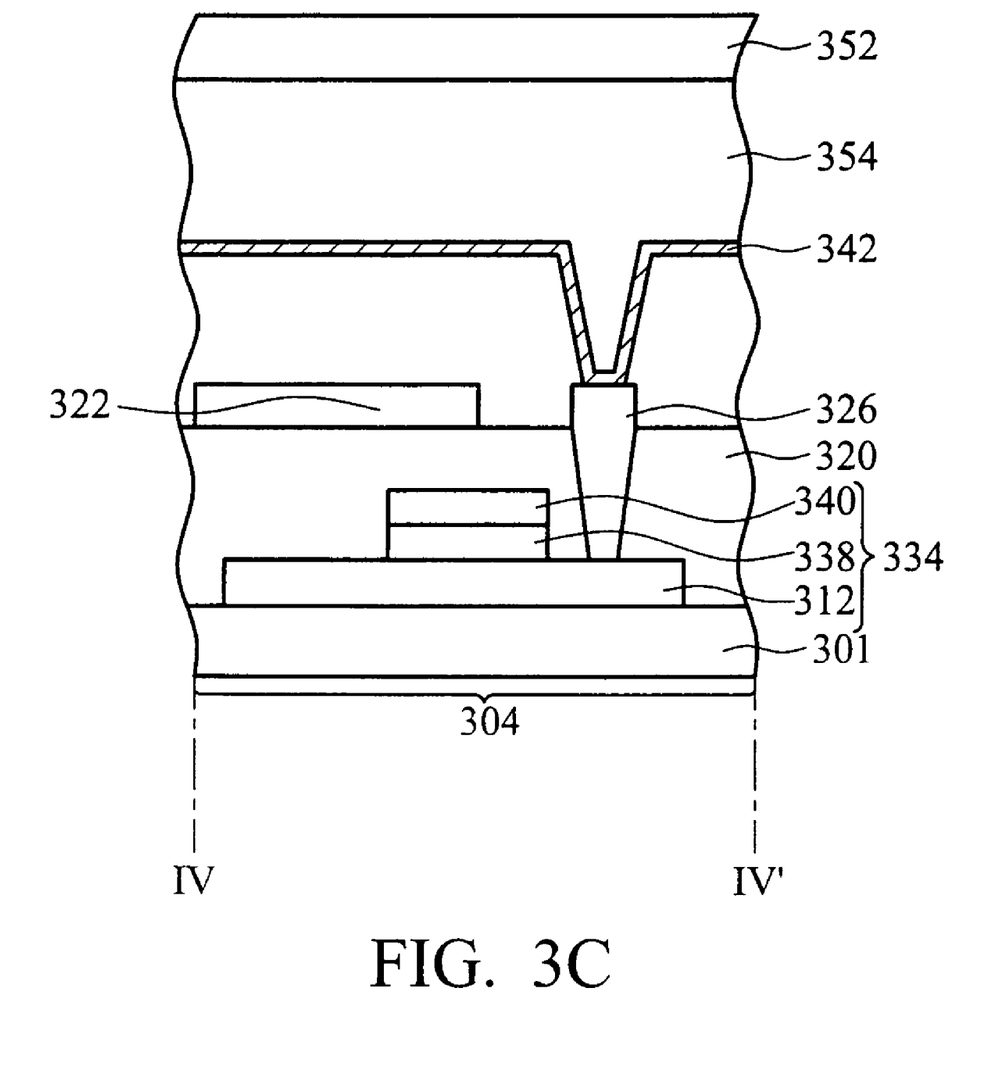
FIG. 3C is cross sections along line IV-IV' of FIG. 3A.

FIG. 3C is a section view taken along line IV-IV' of FIG. 3A. Referring to FIG. 3A, and FIG. 3B, the pixel electrode 342 comprises a plurality of domain electrodes 344, 346 and 348, physically separated by the slit 370 with each other.

In an embodiment of the invention, the storage capacitor Cst 334 comprises two portions 335 and 337, both extending in a different direction. In some embodiment, a first portion 337 of the storage capacitor Cst 334 is disposed in the first domain 304, extending in a row direction. A second portion 335 of the storage capacitor Cst 334 extends in a column direction and underlying the data line for connecting the domain electrodes 344, 346 and 348 of the pixel electrode 342. In some embodiment, the storage capacitor Cst 334 is L shape, wherein the first portion 237 and the second portion 335 of the storage capacitor Cst 334 are perpendicular with each other.

As well, the domain electrodes 344, 346 and 348 of the pixel electrode 342 are connected by a portion 335 of the storage capacitor Cst 334 underlying the data line 322. In addition, the storage capacitor Cst 334 connects the domain electrodes 344, 346 and 348 of the pixel electrode 342 through via in the interlayer dielectric layer 320 and/or the planarization layer 328. Note that the storage capacitor Cst 334 is required to be isolated from the data line 322.

Referring to FIG. 3A, in an embodiment of the invention, the system for displaying image incorporating a liquid crystal display is a multi-domain vertical alignment (MVA) to obtain wider viewing angle. A plurality of protrusions 350 respectively responding to the domains are disposed on the inner side of the color filter substrate 352, wherein the protrusions 350 reduce affection of aperture ratio of the display panel. For example, a first protrusion 351 and a second protrusion 353 are disposed on the color filter substrate 352, respectively corresponding to the second domain 306 and the third domain 308.

According to an embodiment of the invention, the domain electrodes 344, 346 and 348 of a pixel electrode 342 are separated in the slit area 370, such that performance of front of screen of the display panel could be optimized. In addition, the domain electrodes 344, 346 and 348 are connected by the storage capacitor Cst 334 to have a same voltage level, and the ITO neck is not required. Consequently, the ITO neck crack problem could be eliminated. Further, since the storage capacitor Cst of an embodiment of the invention occupies smaller area of the domain electrode 344, and a portion of the storage capacitor Cst 335 is overlapped with the data line 322, the aperture ratio of the display could be increased.

Figure 4:
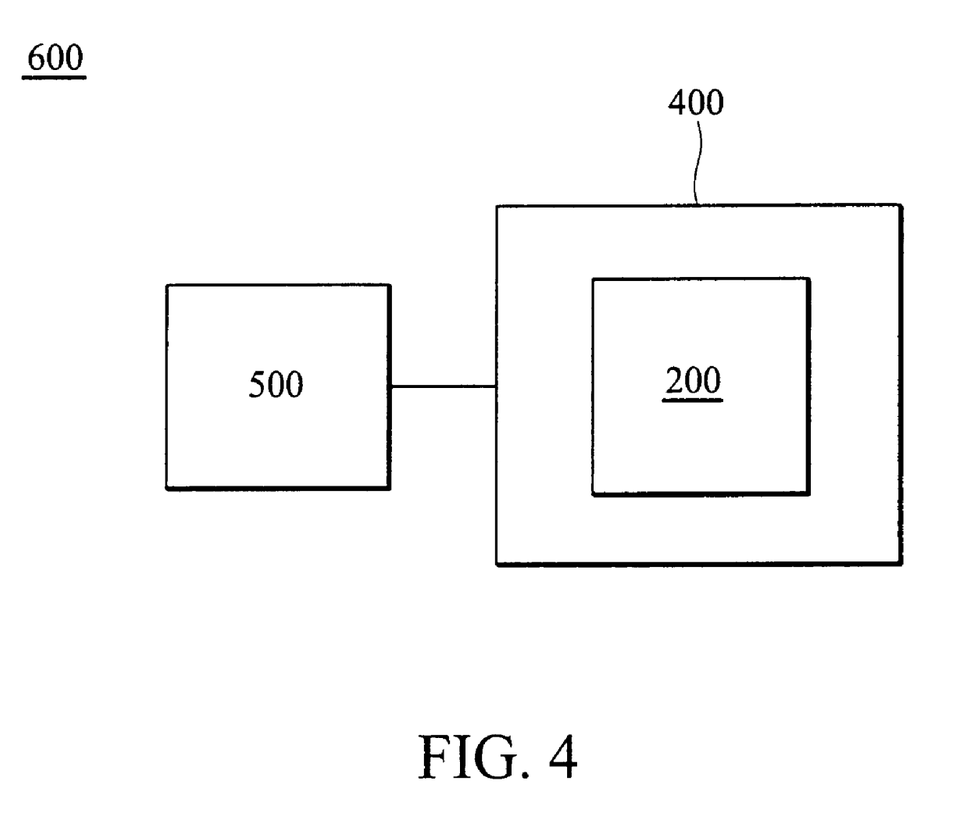
FIG. 4 schematically shows a embodiment of a system for displaying images, incorporating the multi-domain vertical alignment structure of the present invention.

FIG. 4 schematically shows an embodiment of a system for displaying images which is implemented as a liquid crystal display device 400 comprising the display panel 200 (or 300) or an electronic device 600 incorporating Such the liquid crystal display device 400. The electronic device 600 may include a portable handheld device such as a portable DVD player, a mobile phone, a digital camera, a personal digital assistant (PDA), a desktop computer, a television, an in-car display, or a laptop computer. As shown in FIG. 4, the liquid crystal display device 400 may comprise a liquid crystal display panel 200 shown in FIG. 2A or the liquid crystal display panel 300 shown in FIG. 3A. In some embodiments, the display device 400 can be incorporated into the electronic device 600. The electronic device 600 may comprise the display device 400 comprising the display panel 200 and a controller 500 coupled to the display panel 200, in which the controller 500 is operative to control the display panel 200 to render images in accordance with input.

While the invention has been described by way of example and in terms of embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for display images including a display panel, the display panel comprising:
   a multi-domain pixel structure for the display panel, comprising:
   a plurality of electrodes that are physically separated from one another, each defining a domain within a pixel;
   a capacitance element comprising a storage capacitor, electrically connecting the electrodes, a thin film transistor electrically connecting a pixel electrode of the display panel, wherein the pixel electrode comprises the plurality of electrodes serving as domain electrodes, wherein a connection layer is disposed overlying an interlayer dielectric layer covering the thin film transistor and the storage capacitor of the display panel, and the connection layer electrically connects a top electrode of the storage capacitor; and a conductive line electrically connecting the domain electrodes.

2. The system for display images as claimed in claim 1, further comprising a pixel switching element that physically couples to one of the electrodes to switch image data signal to one of the electrodes, whereby the other electrodes also receive the image data signal by way of the connection to the capacitance element.

3. The system for display images as claimed in claim 2, wherein the capacitance element comprises two terminals and a dielectric element, wherein the electrodes are commonly connected to one of the terminals.

4. The system for display images as claimed in claim 3, wherein the pixel switching element comprising a TFT, wherein the storage capacitor works in conjunction with the TFT.

5. The system for display images as claimed in claim 1, further comprising the liquid crystal element in each domain, wherein the display panel is a liquid crystal display panel.

6. An electronic device comprising:
the system for displaying images as in claimed in claim 1; and
a controller coupled to the display panel operative to provide input to the display panel such that the display panel displays images.

7. The electronic device as claimed in claim 6, wherein the electronic device is a mobile phone, digital camera, PDA (personal digital assistant), notebook computer, desktop computer, television, car display, or portable DVD player.

8. The system for display images as claimed in claim 1, wherein the conductive line extends from a bottom electrode of the storage capacitor of the display panel, the conductive line and the bottom electrode of the storage capacitor are the same layer, and both comprise polysilicon or amorphous silicon.

9. The system for display images as claimed in claim 1, wherein the thin film transistor comprises a semiconductor layer disposed overlying the substrate, a gate insulating layer disposed overlying the semiconductor layer, and a gate electrode disposed overlying the gate insulating layer, and the conductive line and the semiconductor layer are the same layer.

10. The system for display images as claimed in claim 1, further comprising a data line for input information signals to the display panel, wherein the data line and the connection layer are the same layer.

11. The system for display images as claimed in claim 1, wherein the thin film transistor is disposed overlying a first substrate, and the display panel further comprises a second substrate opposite the first substrate, wherein the second substrate comprises a plurality of protrusions respectively corresponding to the domains.

12. The system for display images as claimed in claim 11, wherein a portion of the connection layer overlaps with the protrusions.

13. The system for display images as claimed in claim 11, wherein the connection layer connects the domain electrodes of the pixel electrode through a plurality of vias respectively, and the vias substantially overlap the protrusions respectively.

14. The system for displaying images as claimed in claim 1, wherein the display panel comprises:
a first substrate;
wherein the thin film transistor is disposed overlying the first substrate, and
the storage capacitor is disposed overlying the first substrate, electrically connecting the domain electrodes.

15. The system for displaying images as claimed in claim 14, further comprising a data line electrically connecting an electrode of the thin film transistor, and a portion of the storage capacitor is overlapped with the data line.

16. A system for displaying images including a display panel, the display panel comprising:
a multi-domain pixel structure for the display panel, comprising:
a plurality of electrodes that are physically separated from one another, each defining a domain within a pixel;
a capacitance element comprising a storage capacitor, electrically connecting the electrodes;
a first substrate; wherein the thin film transistor is disposed overlying the first substrate, electrically connecting a pixel electrode of the display panel, wherein the pixel electrode comprises the plurality of electrodes serving as domain electrodes, and the storage capacitor is disposed overlying the first substrate, electrically connecting the domain electrodes;
a data line electrically connecting an electrode of the thin film transistor, and a portion of the storage capacitor is overlapped with the data line,
wherein the storage capacitor comprises a first portion underlying one of the domain electrodes of the pixel electrode and a second portion underlying the data line, and the second portion of the storage capacitor electrically connects the domain electrodes of the pixel electrode.

17. The system for displaying images as claimed in claim 16, wherein the first portion and the second portion extend in different directions.

18. The system for displaying images as claimed in claim 16, wherein the first portion of the storage capacitor comprises a bottom electrode, a top electrode and a capacitor dielectric layer interposed between the top electrode and the bottom electrode, and the top electrode and the gate are the same layer, the capacitor dielectric layer and the gate insulating layer are the same layer, and the bottom electrode and the semiconductor layer are the same layer.

* * * * *